C. Steinmann.
Exterminating the Cotton-Worm &c.
N° 74165     Patented Feb. 4, 1868.
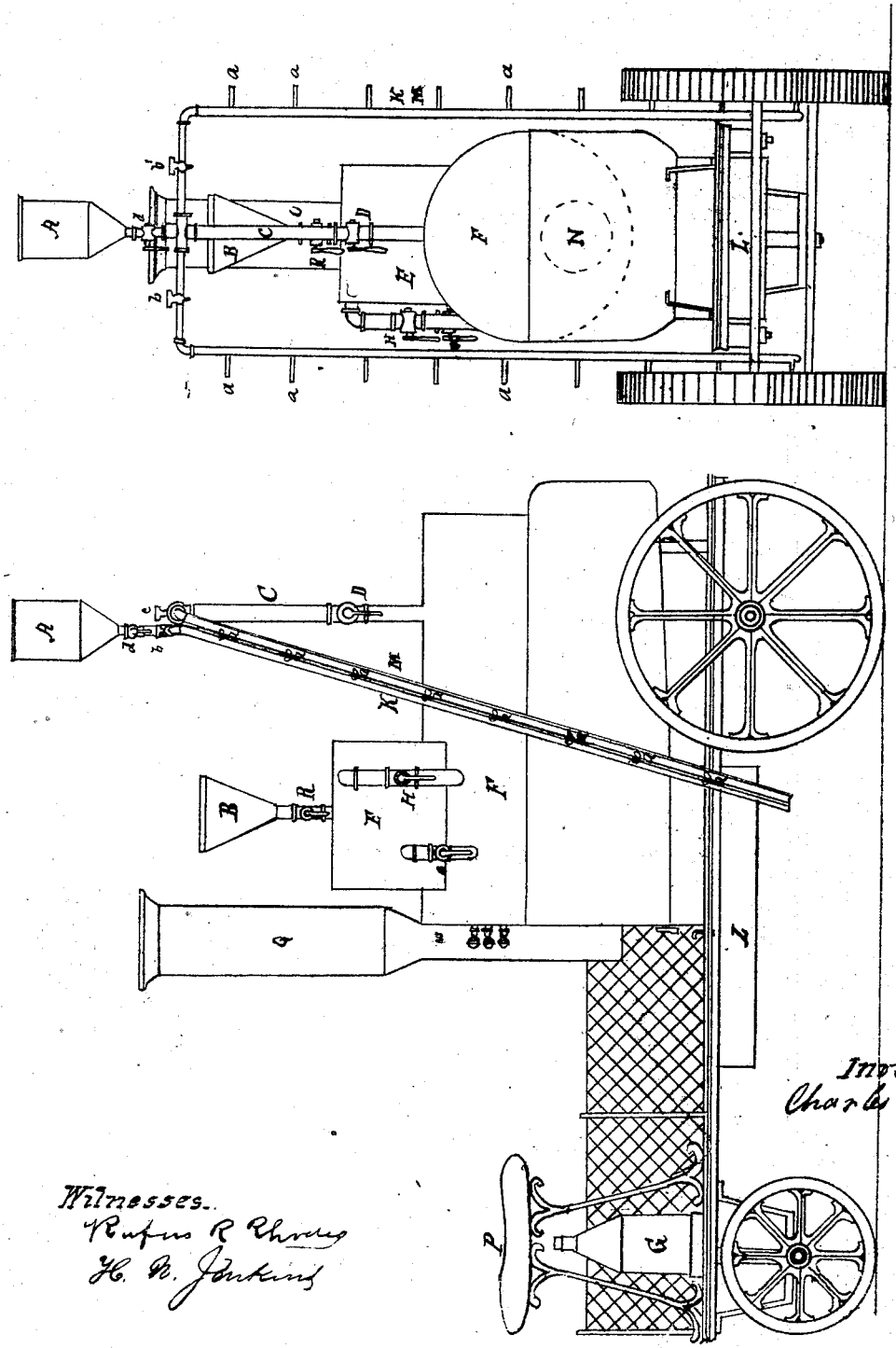
Witnesses
Rufus R. Rhodes
H. R. Jenkins
Inventor.
Charles Steinmann

United States Patent Office.

CHARLES STEINMANN, OF NAPOLEONVILLE, LOUISIANA.

*Letters Patent No. 74,165, dated February 4, 1868.*

---

IMPROVEMENT IN MACHINE FOR EXTERMINATING THE COTTON-WORM, &c.

---

*The Schedule referred to in these Letters Patent and making part of the same.*

---

TO ALL WHOM IT MAY CONCERN:

Be it known that I, CHARLES STEINMANN, of Napoleonville, in the parish of Assumption, and State of Louisiana, have invented a certain new, useful, and improved Machine for Exterminating the Cotton-Worm and all other destructive insects that prey upon that or other vegetables, or upon fruit-trees or fruits; and I do hereby declare the following to be a full, clear, and exact description of the same, reference being had to the annexed drawings, making part of this specification, in which—

Figure 1 is a side elevation of my invention, and

Figure 2 a rear end view of the same.

The terrible and disastrous effects upon the general interests of the people of the United States, especially in what are known as the southern States thereof, resulting from the voracious depredations of the innumerable swarms of the insect designated by the general appellation of the cotton or army-worm, and other varieties of the caterpillar tribe, upon the cotton-plant, are so well known, that a bare reference to them is sufficient to indicate the immense importance and value of the discovery or invention of any sure means of destroying these small, but formidable enemies of the cotton-planter, and thus of averting the annual loss they entail. And if, in the invention of such means, it shall chance that an instrumentality has been created that is as potential in exterminating all other destructive insects, no matter what their species, nor the vegetable or object upon which they prey, it becomes at once apparent that that invention possesses an economic worth that is almost beyond the limit of human calculation; and yet I have, after years of laborious and painstaking investigation, and multiplied experiments, invented such a means, and now come, in the terms of the statute, to ask for that protection from the Government which it guarantees.

I employ a novel compound vapor in connection with my machine, but inasmuch as in this application I do not propose to claim the same, nor its use, its nature will be sufficiently disclosed by such reference to it as will be necessary in describing the machine, which produces, applies, and distributes it, and which does form the subject of my application.

This machine consists, to state its nature in comprehensive general terms, of an ordinary steam-boiler, that is provided with a novel arrangement of tubes or pipes for the distribution of the steam generated by it, in combination with a reservoir or tank to contain oil, which, in its turn, is supplied with mechanical appendages for the proper bestowal and distribution of the oil, the whole combination being placed upon a suitable frame or platform supported on wheels, in order that the machine may be easily portable or transportable in its operations against the creatures it is intended to destroy.

With these brief introductory remarks, I proceed to describe my invention in detail, and with especial reference to the drawings, upon which, at both the figures, the same letters denote the same parts.

Referring, then, to the drawings, the part marked A represents the receiver or reservoir, to contain the oleaginous liquid that is employed, which may be of any cheap kind, and B a funnel to facilitate the operation of supplying the boiler with water, at such recurring intervals as may be necessary, but it connects directly with a heater, E, that is placed on top of the boiler, instead of with the boiler proper, in which heater a supply of water is always kept, to be heated by the radiation of heat from that part of the boiler or shell of the boiler on which it rests. The interior of the heater is connected with the interior of the boiler F by two pipes, H and O, which are each provided with a stop-cock. In consequence of this mode of connection, the water in the heater can be retained therein, or driven into the boiler, at pleasure, it being only necessary to keep the cocks closed to retain it, or to open them to force the water into the boiler. The latter result is accomplished by the pressure of the steam through pipe H, the water going into the boiler through pipe O. Whenever the water is thrown out of the heater into the boiler, the former should be refilled through the funnel B, the stop-cock, in the short pipe R to which it is attached, being opened to allow the water to enter. On top of the boiler, at some point between its rear end and the heater E, a perpendicular pipe, C, is inserted into it, which pipe should be long enough to carry its upper end to a height somewhat above the tallest cotton-plants. The pipe C is provided with a stop-cock, D, and connects at its upper extremity with a cross-pipe, M, which ought to be substantially of the form as shown at fig. 2, and to approach very near the ground at both its ends. In that portion or section of the pipe M that is horizontal, are two stop-cocks, one upon either side of the point of connection with pipe C, which serve the purpose of stopping the issue of steam either entirely, or upon one side only of the machine. At a point near and below the flexures or elbows of the pipe M at which it turns towards the ground, on both sides of the machine, and from this point down to the two extremities of the said pipe, at short intervals, are inserted small short pipes $a$, as shown upon the drawings, which diminishing in size to their extremities, where they come very nearly to a point, serve as vents or jets for the escaping steam when the machine is in use or operation. Placed alongside the pipe M, in front of it, and in contact with it everywhere, excepting only for a little space near its top part, where it bends forward, as shown at fig. 1, is another pipe K, exactly corresponding with pipe M in size and figuration, and provided with the same number of precisely similar jet-pipes $a$, that are so placed or arranged as to be exactly over the corresponding jets in pipe M, that is to say, at their extremities, and in the closest possible contact therewith. The object of this arrangement is to insure the dripping of the oil over the orifices from which the steam escapes. Over the centre of the upper and horizontal section of pipe K, and connecting therewith by a short pipe, $d$, is placed the reservoir A for oil, to which I have before referred. Stop-cocks in the pipe K, near to and upon each side of the pipe $d$, prevent a flow of oil down either end of said pipe K, or permit it to flow into both or only one end, as the exigencies of the occasion may require, at the pleasure of the operator. A platform in front of the boiler or furnace is provided, on which a supply of fuel may be carried, a light railing or lattice-guard on the sides of the platform preventing said fuel from falling off. A driver's seat, P, is placed on this platform, under which a vessel of oil may be conveniently carried to replenish reservoir A from time to time with a new supply, as well as wrenches and such other light implements as may be needful in the management of the machine. If found necessary or expedient, the pipes M and K may be duplicated or multiplied, and their position and form may vary from the plan as delineated on the drawings, or the oil and steam may issue from one pipe and series of nipples; but for ordinary use no such addition or change will be required.

The boiler being supplied with a proper quantity of water, and the heater filled with water, and the oil-reservoir with oil, the operation of my apparatus is as follows, to wit: Steam is raised and the machine placed in position to begin work between two rows of cotton, which we may suppose to be the two rows next one end or side of the field. The stop-cocks in pipe K are now opened, and as soon as the oil begins to flow from the jet-pipes $a$, those in pipe M are also opened and the machine started. The steam, as it rushes out of its own series of jet-pipes or nipples, passes through the dripping oil and expands and transforms the same into vapor, which, intermingling and spreading out with the steam and changing its character, envelopes the proximate rows of cotton-plants, and kills every caterpillar or other insect upon them. It does more; its effect is so deadly that it destroys the eggs of the worm, and leaves an invisible influence upon every part of the plants that have been bathed with it, which keeps off those worms that, coming into the field from other quarters afterwards, might otherwise prove as destructive as those that have been killed would have been if they had been permitted to live. This I have verified by prolonged and careful watching, and hence it will be seen that my invention not only will destroy the unhatched and living insects upon any given field, but that it will shield that field from all danger of depredation from such as may come into it from outside localities, and hence, further, that upon its general use, it will finally exterminate every tribe of insect, and relieve the country of the anxiety and heavy loss they have heretofore every year inflicted. But to return to the operation of the machine: After two rows have been covered with the vapor, the machine is carried across the field, between the next two rows of plants, and so on until it has been made to traverse the whole field, and envelope every plant in it with its oleaginous vapor, and then its work for the season is accomplished, and the crop saved on every foot of ground over which it has passed.

My invention may be of any prescribed dimensions, to be drawn by one or more mules or horses, and there is no need to make it of costly construction; and inasmuch as it will destroy the worms in a great many fields in a season, and may be bought by an association of planters, its valuable services may be enjoyed by every planter, however limited his means. As herein described, and delineated on the drawings, the machine is designed and adapted especially for the extermination of the insects that prey on cotton-plants, and it may be used at any time after the plants are up, and at any stage of their growth, as I have demonstrated by experiment, without the slightest risk of injury to them. The best time for using it, in my judgment, is when the plants are young and the worms in the embryo state. Any cheap oil may be employed, such as petroleum, lard, or cotton-seed oil, or the like, care being taken that no acid is contained in it. Those oils that give out the strongest and most disagreeable odors are, perhaps, the most effective.

If insects upon fruit-trees, vines, and certain plants other than cotton, are to be attacked, it will be necessary to modify the form and construction of my invention, so as to adapt it to such purpose, but it is not necessary herein to explain the particular manner of making such modifications.

Having thus described my invention, and its *modus operandi*, what I claim, and desire to secure by Letters Patent, is—

The portable steam-generator or boiler F, or its equivalent, in combination with the pipes M and K, when these pipes are provided with the jets or nipples $a$, and are otherwise constructed as herein described, and the former is used as a steam and the latter as an oil-distributer, the whole being arranged substantially as and for the purpose set forth.

CHARLES STEINMANN.

Witnesses:
  RUFUS R. RHODES,
  H. W. JENKINS.